US010535318B2

(12) United States Patent
Du et al.

(10) Patent No.: US 10,535,318 B2
(45) Date of Patent: Jan. 14, 2020

(54) ARRAY SUBSTRATE AND DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Ruifang Du, Beijing (CN); Xiaoye Ma, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 16/090,431

(22) PCT Filed: Apr. 11, 2018

(86) PCT No.: PCT/CN2018/082644
§ 371 (c)(1),
(2) Date: Oct. 1, 2018

(87) PCT Pub. No.: WO2019/037440
PCT Pub. Date: Feb. 28, 2019

(65) Prior Publication Data
US 2019/0122626 A1 Apr. 25, 2019

(30) Foreign Application Priority Data

Aug. 21, 2017 (CN) .......................... 2017 1 0723330

(51) Int. Cl.
*G09G 3/36* (2006.01)
*G02F 1/1362* (2006.01)
(Continued)

(52) U.S. Cl.
CPC ......... *G09G 3/3677* (2013.01); *G02F 1/1362* (2013.01); *G02F 1/136213* (2013.01);
(Continued)

(58) Field of Classification Search
None
See application file for complete search history.

(56) References Cited

U.S. PATENT DOCUMENTS

2007/0200992 A1* 8/2007 Kim ...................... G02F 1/1362
349/143
2007/0296899 A1 12/2007 Murade
(Continued)

FOREIGN PATENT DOCUMENTS

CN 101093324 A 12/2007
CN 101424833 A 5/2009
(Continued)

OTHER PUBLICATIONS

International Search Report dated Jul. 5, 2018, issued in counterpart application No. PCT/CN2018/082644. (12 pages).

*Primary Examiner* — Nicholas J Lee
(74) *Attorney, Agent, or Firm* — Westerman, Hattori, Daniels & Adrian, LLP

(57) ABSTRACT

The present disclosure is related to an array substrate. The array substrate may include a plurality of gate lines, a plurality of data lines intersecting the gate lines, and a first gate driving circuit comprising a plurality of shift register circuits in a non-active area. The gate lines and the data lines may define a plurality of sub-pixels in an active area and a plurality of dummy sub-pixels in the non-active area adjacent to the active area. The first gate driving circuit may be farther away from the active area than the plurality of the dummy sub-pixels. At least one of the dummy sub-pixels may include an auxiliary capacitor. A shift register circuit in the first gate driving circuit may be coupled to the auxiliary (Continued)

capacitor. The auxiliary capacitor may form at least a part of a bootstrap capacitor in the shift register circuit.

16 Claims, 9 Drawing Sheets

(51) Int. Cl.
  *G02F 1/1333* (2006.01)
  *G02F 1/1343* (2006.01)
(52) U.S. Cl.
  CPC ... *G09G 3/36* (2013.01); *G02F 2001/133388* (2013.01); *G02F 2001/134372* (2013.01); *G09G 2300/0408* (2013.01); *G09G 2300/0413* (2013.01); *G09G 2300/0426* (2013.01); *G09G 2300/0876* (2013.01); *G09G 2310/0286* (2013.01)

(56) References Cited

U.S. PATENT DOCUMENTS

| | | | | |
|---|---|---|---|---|
| 2014/0346475 | A1* | 11/2014 | Cho | H01L 27/326 257/40 |
| 2015/0102312 | A1* | 4/2015 | Lee | G09G 3/3233 257/40 |
| 2015/0262526 | A1* | 9/2015 | Park | G09G 3/3233 345/76 |
| 2016/0086548 | A1 | 3/2016 | Maeyama | |
| 2016/0335950 | A1 | 11/2016 | Kang et al. | |
| 2017/0193963 | A1 | 7/2017 | Pan et al. | |

FOREIGN PATENT DOCUMENTS

| | | |
|---|---|---|
| CN | 105144273 A | 12/2015 |
| CN | 105487313 A | 4/2016 |
| CN | 106298844 A | 1/2017 |

\* cited by examiner

US 10,535,318 B2

ARRAY SUBSTRATE AND DISPLAY APPARATUS

CROSS-REFERENCE TO RELATED APPLICATIONS

This application claims benefit of the filing date of Chinese Patent Application No. 201710723330.7 filed on Aug. 21, 2017, the disclosure of which is hereby incorporated by reference.

TECHNICAL FIELD

This disclosure relates to display technology, and more particularly, to an array substrate and a display apparatus.

BACKGROUND

A screen, such as a display panel of a Thin Film Transistor-Liquid Crystal Display (TFT-LCD), usually comprises an active area and a non-active area located at periphery of the active area. A gate driver is in the non-active area for performing line-by-line scan on gate lines. The present gate driver usually adopts a Gate Driver on Array (GOA) design. A GOA circuit is usually formed by integrating a gate switching circuit mainly composed of Thin Film Transistors (TFTs) on a display panel. As such, a narrow frame design can be realized without binding a gate driving integrated circuit (IC).

BRIEF SUMMARY

Accordingly, one example of the present disclosure is an array substrate. The array substrate may include a plurality of gate lines, a plurality of data lines intersecting the gate lines, and a first gate driving circuit comprising a plurality of shift register circuits in a non-active area. The gate lines and the data lines may define a plurality of sub-pixels in an active area and a plurality of dummy sub-pixels in the non-active area adjacent to the active area. The first gate driving circuit may be farther away from the active area than the plurality of the dummy sub-pixels. At least one of the dummy sub-pixels may include an auxiliary capacitor. A shift register circuit in the first gate driving circuit may be coupled to the auxiliary capacitor. The auxiliary capacitor may form at least a part of a bootstrap capacitor in the shift register circuit.

The array substrate may further include a common electrode line and a common electrode and a pixel electrode in each of the dummy sub-pixels in the non-active region and each of the sub-pixels in the active area. The common electrode and the pixel electrode may be arranged in different layers. In at least one of the dummy sub-pixels, the common electrode may be shared as a first electrode of an auxiliary capacitor and the pixel electrode may be shared as a second electrode of the auxiliary capacitor.

The shift register circuit in the first gate driving circuit may include a driving transistor. The first electrode of the auxiliary capacitor may be coupled to a gate electrode of the driving transistor through a first connection line. The second electrode of the auxiliary capacitor may be coupled to a signal output terminal of the shift register circuit through a second connection line. There may be only a passivation layer between the common electrode and the pixel electrode. The common electrode and the pixel electrode may be made of indium tin oxide. The pixel electrode may consist of strip-shaped electrodes and the common electrode is a planar electrode. Signal output terminals of the plurality of the shift register circuits may be respectively coupled to the gate lines. One terminal of the second connection line may be coupled to the second electrode of the auxiliary capacitor, and the other terminal of the second connection line may be coupled to one of the gate lines. The first connection line, the second connection line, and the gate lines may be made of the same material in the same layer. Each of the plurality of the dummy sub-pixels may include a thin film transistor. A first electrode of the thin film transistor may be coupled to a data line, and a second electrode of the thin film transistor may be floating.

The array substrate may further include a plurality of auxiliary capacitors in the dummy sub-pixels respectively. The auxiliary capacitors coupled to a same stage of shift register circuit may be respectively located in a plurality of the dummy sub-pixels in the same row. The plurality of the shift register circuits and the plurality of the dummy sub-pixels may be at one side of the active area, and each of the plurality of the shift register circuits may be coupled to one of the gate lines and auxiliary capacitors in the dummy sub-pixels of the same row. The plurality of the dummy sub-pixels may include two or three columns of the dummy sub-pixels. Both the plurality of the shift register circuits and the plurality of the dummy sub-pixels may be at two sides of the active area, each of the plurality of the shift register circuits may be coupled to one of the gate lines and auxiliary capacitors in the dummy sub-pixels of the same row at the same side. The plurality of the dummy sub-pixels may include two or three columns of the dummy sub-pixels at the two sides of the active area respectively.

The array substrate may further include a second gate driving circuit. The plurality of the dummy sub-pixels may be at two sides of the active area, and the first gate driving circuit and the second gate driving circuit may be at the two sides of the active area respectively. Two shift register circuits of the same stage in the first gate driving circuit and the second gate driving circuit respectively may be coupled to two terminals of a same gate line respectively. Each of the shift register circuits in the first gate driving circuit and the second gate driving circuit may be coupled to auxiliary capacitors in the dummy sub-pixels of the same row at the same side.

Another example of the present disclosure is a display apparatus. The display apparatus may include an array substrate according to one embodiment of the present disclosure.

BRIEF DESCRIPTION OF THE DRAWINGS

The subject matter which is regarded as the disclosure is particularly pointed out and distinctly claimed in the claims at the conclusion of the specification. The foregoing and other objects, features, and advantages of the disclosure are apparent from the following detailed description taken in conjunction with the accompanying drawings in which:

DETAILED DESCRIPTION

Figure 1:
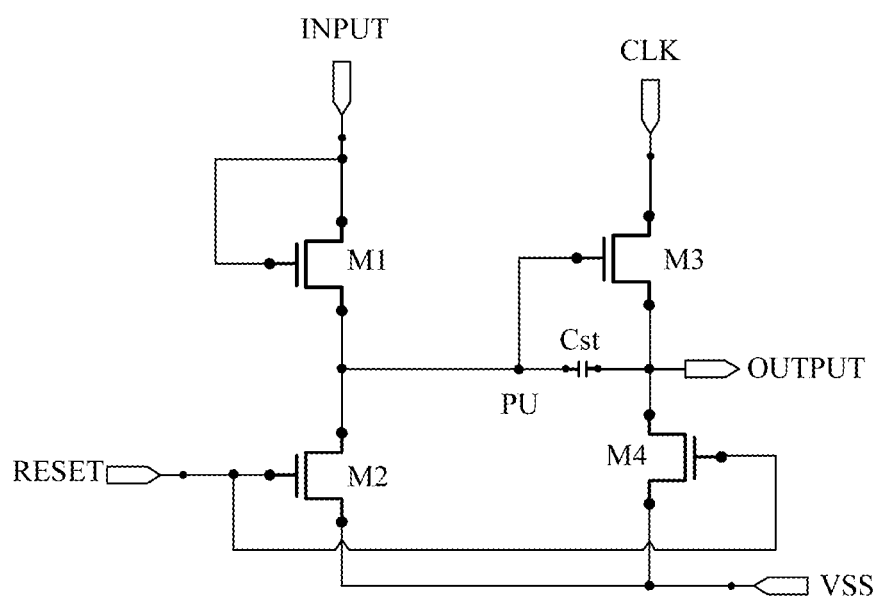
FIG. 1 is a schematic diagram of a shift register circuit in a gate driving circuit in the prior art.

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-9. When referring to the figures, like structures and elements shown throughout are indicated with like reference numerals.

In this specification, the numerical terms such as "first," "second," etc. may be added as prefixes. These prefixes, however, are only added in order to distinguish the terms and do not have specific meaning such as order and relative merits.

A GOA circuit usually comprises a plurality of cascaded shift register circuits. Each of the shift register circuits is coupled to one row of gate line. Accordingly, row-by-row scanning of the gate lines can be realized through the GOA circuit. Specifically, in some embodiments, as shown in FIG. 1, the shift register circuit comprises a driving transistor M3, a bootstrap capacitor $C_{st}$ coupled to the driving transistor M3, and a plurality of other switching transistors. The drive transistor M3 can be maintained in a conductive state by the bootstrap capacitor $C_{st}$ when the shift register circuit outputs a gate scanning signal.

However, when a clock signal terminal CLK outputs to a signal output terminal OUTPUT of the shift register circuit through the driving transistor M3, noise generated by the clock signal terminal CLK can be coupled to the signal output terminal OUTPUT of the shift register circuit through the driving transistor M3. The noise can be equivalently expressed as:

$$V_{couple} = \Delta V_{clk} \times \frac{C_{gd3}}{C + C_{gs1} + C_{gd2} + C_{gs3} + C_{gd3}} \quad (1)$$

Wherein, $\Delta V_{clk}$ is a differential pressure of the output signal at the clock signal terminal CLK. C is a capacitance of the bootstrap capacitor $C_{st}$. $C_{gs1}$ is a coupling capacitance between a gate electrode and a source electrode of transistor M1. $C_{gd2}$ is a coupling capacitance between a gate electrode and a drain electrode of transistor M2. The $C_{gs3}$ is a coupling capacitor between a gate electrode and a source electrode of the driving transistor M3. $C_{gd3}$ is a coupling capacitance between a gate electrode and a drain electrode of the driving transistor M3. As can be seen from formula (1), the larger the capacitance of the bootstrap capacitor $C_{st}$, the smaller the noise. However, as the capacitance of the bootstrap capacitor is increased, the area of the bootstrap capacitor is also increased. As such, the GOA circuit will occupy more wiring space of the non-active area, thereby not facilitating narrow frame design.

Figure 2:
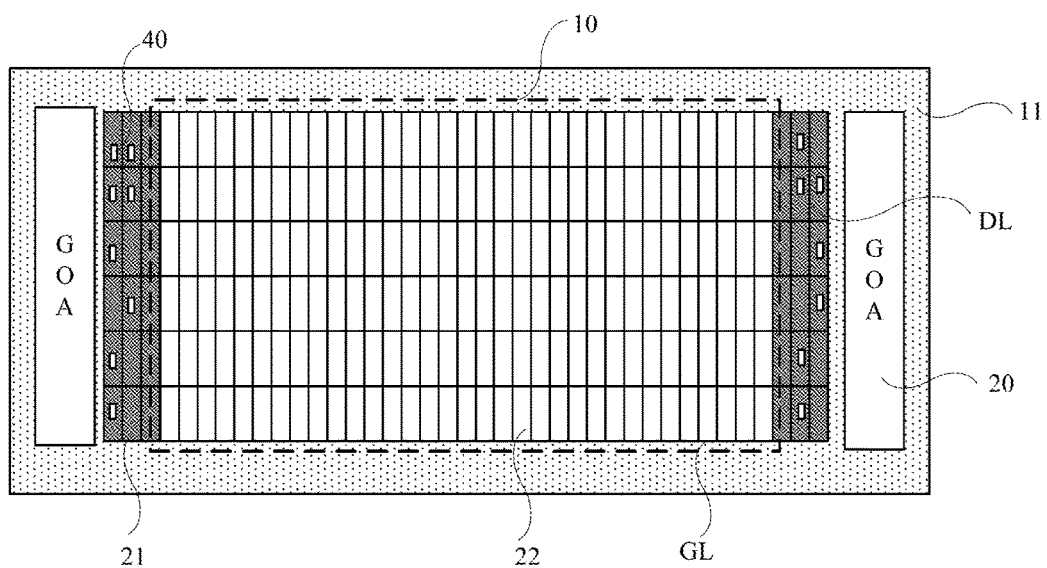
FIG. 2 is a schematic diagram of an array substrate according to one embodiment of the present disclosure.

FIG. 2 is a schematic diagram of an array substrate according to one embodiment of the present disclosure. As shown in FIG. 2, the array substrate includes an active area 10 and a non-active area 11 located at the periphery of the active area 10.

The active area 10 includes a plurality of gate lines GL and data lines DL intersecting horizontally and vertically. The intersecting gate lines and data lines DL define a plurality of sub-pixels 22 arranged in a matrix. The sub-pixels 22 located in the middle part of the active area 10 are surrounded by a plurality of other sub-pixels 22. However, the sub-pixels 22 located at the edges of the active area 10 have one side next to the non-active area 11, and accordingly are not surrounded by other sub-pixels 22 at the side next to the non-active area 11. In this case, due to limitation in a manufacturing process of the array substrate, patterns of the sub-pixels 22 in the middle part of the display area 10 are usually different from those at the edges of the display area 10. For example, concentrations of etching liquid at the middle part and the edges of the display area are usually different in an etching process.

In some embodiments, in order to solve this problem, the gate lines GL and the data lines DL in the active area 10 can be extended to the non-active area 11 so that a plurality of rows or columns of dummy sub-pixels 21 defined by the extended gate lines GL and the data lines DL are formed in the non-active area 11 adjacent to the active area 10. As such, those sub-pixels 22 located at the edges of the active area 10 are surrounded by the dummy sub-pixels 21 at the side next to the non-active area 11. Accordingly, in the etching process, uniformity of the concentration of the etching liquid in the active area 10 is improved, and patterns of the sub-pixels 22 in the active area 10 are more consistent.

In some embodiments, both the dummy sub-pixels 21 and the sub-pixels 22 are each provided with a pixel electrode 30.

Accordingly, the dummy sub-pixels 21 are arranged on the periphery of the active area 10. In addition, because the dummy sub-pixels 21 are located in the non-active area 11, the dummy sub-pixels 21 are not used for displaying.

Figure 3:
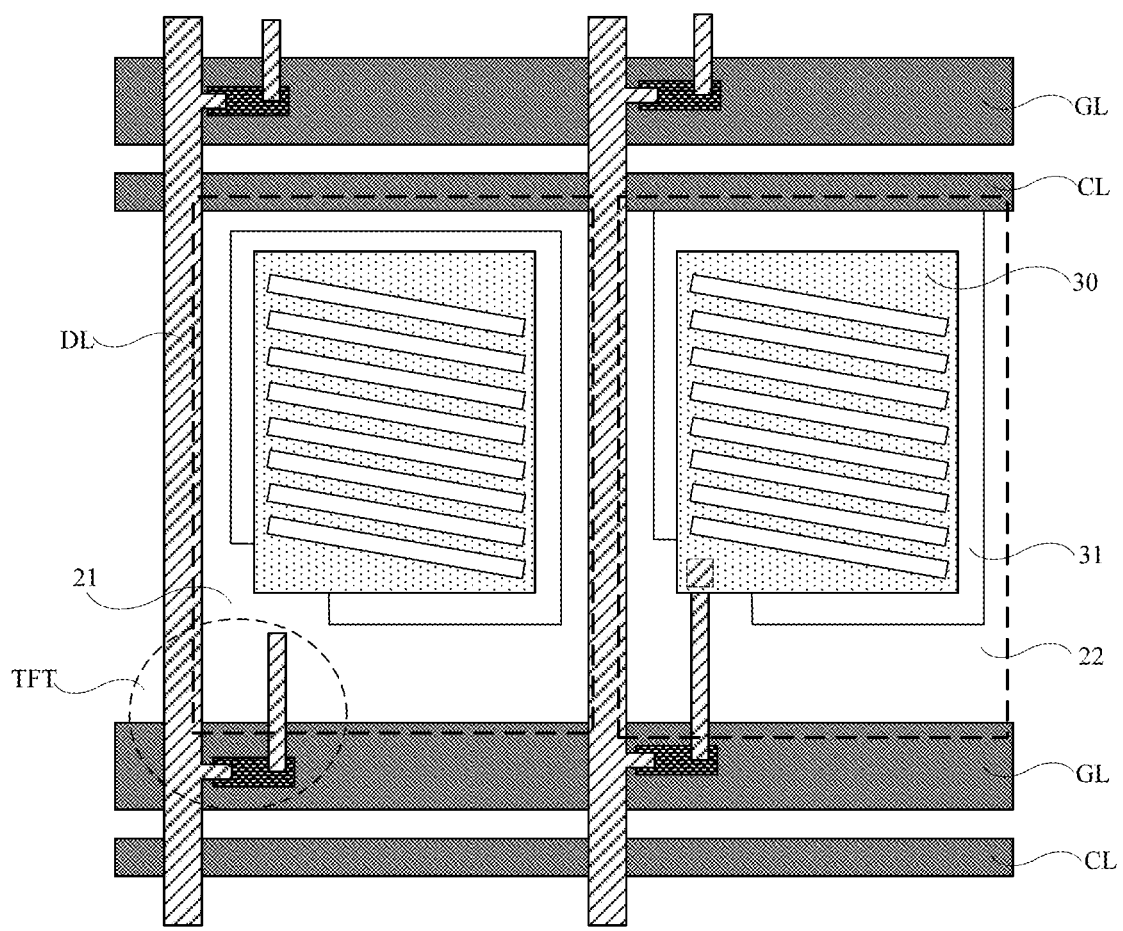
FIG. 3 is a schematic diagram of a dummy sub-pixel and a sub-pixel according to one embodiment of the present disclosure.

In some embodiments, as shown in FIG. 3, a first electrode of a TFT in a dummy sub-pixel 21 is coupled to the data line DL. A second electrode of the TFT in the dummy sub-pixel 21 is floating, that is, the second electrode of the TFT is not coupled to a pixel electrode 30 in the dummy sub-pixel 21. As such, signals on the data line DL cannot be passed through the TFT to the pixel electrode 30 in the dummy sub-pixel 21, thereby preventing the dummy sub-pixel 21 from displaying an image.

In some embodiments, the array substrate further comprises a common electrode line CL for providing a common voltage Vcom. The data lines DL for defining the dummy sub-pixels 21 can be coupled to the common electrode line CL. As such, even when the second electrode of the TFT in the dummy sub-pixel 21 is coupled to the pixel electrode 30 in the dummy sub-pixel 21 due to an unexpected effect of a manufacturing process or limitation of process precision, the signals on the data lines DL can be pulled down to the common voltage Vcom because the data lines DL for defining the dummy sub-pixels 21 are coupled to the common electrode line CL. Thus, the pixel electrode 30 in the dummy sub-pixel 21 and the common electrode 31 have the same voltage and no electric field is generated between them. As a result, liquid crystal molecules in the dummy sub-pixels 21 do not deflect, thereby ensuring that the dummy sub-pixels 21 do not display images.

In some embodiments, the array substrate further comprises a gate driving circuit 20 located in the non-display region 11. The gate driving circuit 20 is farther away from the active area 10 than the dummy sub-pixels 21.

Figure 4:
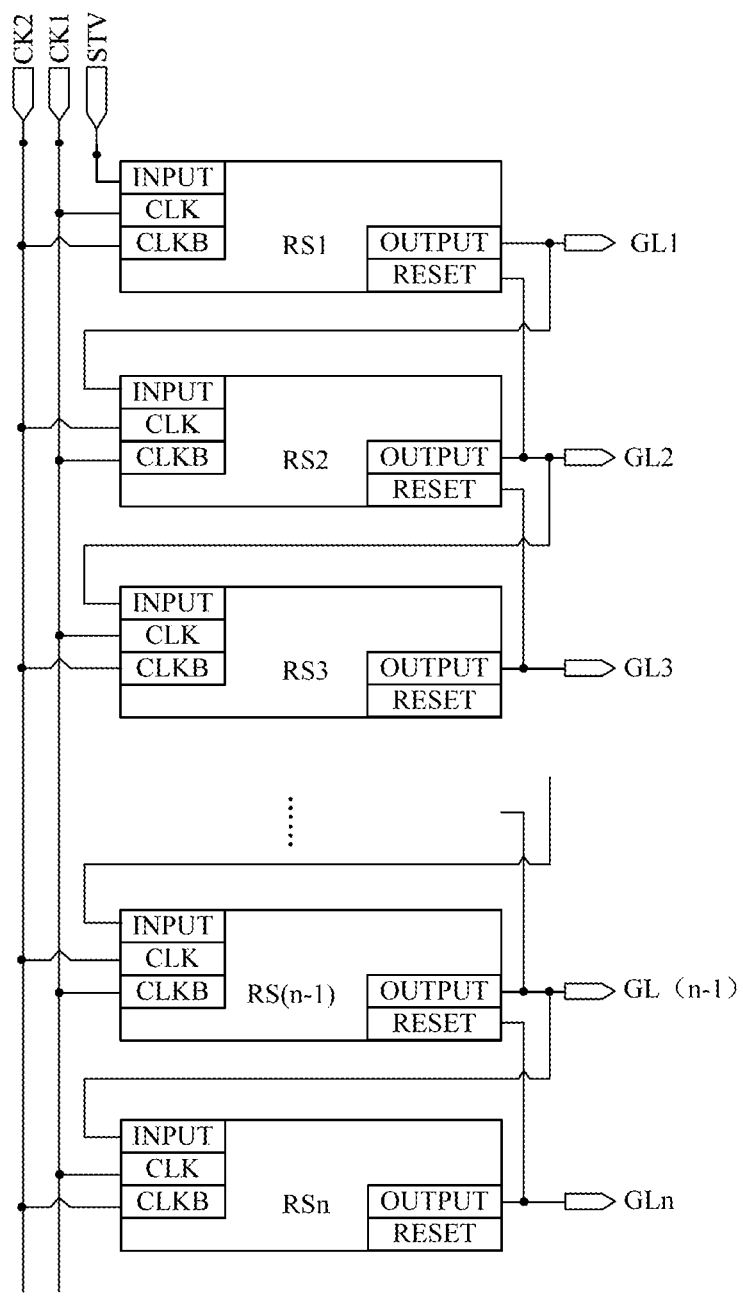
FIG. 4 is a schematic diagram of a gate driving circuit according to one embodiment of the present disclosure.

In some embodiments, as shown in FIG. 4, the gate driving circuit 20 includes a plurality of cascaded shift register circuits, that is, RS1, RS2 . . . RSn. n is a positive integer larger than or equal to 2. Except the first-stage of shift register circuit RS1, the signal output terminal OUTPUT of the previous stage of shift register circuit is coupled to the signal input terminal INPUT of the next stage of shift register circuit. The signal input terminal INPUT of the first-stage of shift register circuit RS1 is coupled to a start signal terminal STV. In addition, clock signal terminals CLK and CLKB of each stage of shift register circuit are alternately coupled to system clocks CLK1 and CLK2 respectively.

In some embodiments, as shown in FIG. 2, an auxiliary capacitor 40 is arranged in at least one or some of the dummy sub-pixels 21. A shift register circuit RS in the gate driving circuit 20 is coupled to the auxiliary capacitor 40. The auxiliary capacitor 40 forms at least a part of a bootstrap capacitor $C_{st}$ in the shift register circuit RS. The auxiliary capacity 40 is used to increase the capacitance of the boostrap capacitor Cst which is needed by the GOA circuit so as to decrease the coupling noise at the signal output terminal OUTPUT of the shift register circuit RS. Meanwhile, since the auxiliary capacity 40 which is part of the bootstrap capacitor Cst is arranged outside the shift register circuit Rs, the occupation area of the bootstrap capacitor Cst in the wiring space of the non-active area 11 is decreased.

The number of columns of the dummy sub-pixels 21 between the gate driving circuit 20 and the active areas 10 is not limited herein. In some embodiments, 2 or 3 columns of dummy sub-pixels 21 are arranged. An auxiliary capacitor 40 is respectively arranged in all the dummy sub-pixels 21 or only in some of the dummy sub-pixels 21.

In some embodiments, the auxiliary capacitor 40 forms at least a part of the bootstrap capacitor $C_{st}$ in the shift register circuit RS. Thus, a part of the bootstrap capacitor $C_{st}$ is arranged inside the shift register circuit, and the other part thereof is arranged in the dummy sub-pixel 21 as the auxiliary capacitor 40. In some embodiments, the whole bootstrap capacitor $C_{st}$ is arranged in the dummy sub-pixels 21 as the auxiliary capacitor 40. As such, the capacitance of the bootstrap capacitor $C_{st}$ can be improved by increasing the number of the dummy sub-pixels 21 having an the auxiliary capacitor 40, thereby decreasing the coupling noise at the signal output terminal OUTPUT of the shift register circuit RS caused by the signal inputted from the clock signal terminal coupled to the shift register circuit RS. In addition, since a part of or a whole bootstrap capacitor $C_{st}$ is in the dummy sub-pixel 21 as the auxiliary capacitor 40, the area of the bootstrap capacitor $C_{st}$ inside the shift register circuit RS can be reduced, thereby reducing occupation area of the bootstrap capacitor $C_{st}$ in the wiring space of the non-active area 11. This is conducive to a narrow frame design. Since the auxiliary capacitor 40 forms at least a part of the boot strap capacity Cst in the shift register circuit RS, even though the capacitance of bootstrap capacitor Cst inside the shift register circuit RS is reduced along with the reduction of the area thereof, the capacitance of the whole bootstrap capacitor Cst is not decreased, but increased because of the existence of the dummy sub-pixel 21 as the auxiliary capacitor 40. Furthermore, since the dummy sub-pixels 21 are not used for displaying, the auxiliary capacitors 40 arranged in the dummy sub-pixels 21 do not affect the display effect.

Arrangement embodiments of the auxiliary capacitors 40 are described in detail as follows:

In some embodiments, as shown in FIG. 3, the array substrate further comprises a common electrode line (CL), common electrodes 31 and pixel electrodes 30 located in the dummy sub-pixels 21 and the sub-pixels 22 of the active area 10.

Figure 5:
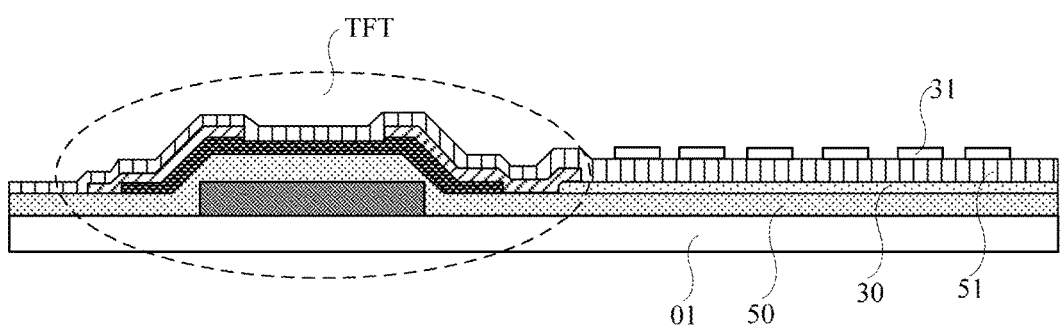
FIG. 5 is a schematic diagram of an arrangement of a pixel electrode and a common electrode according to one embodiment of the present disclosure.
Figure 6:
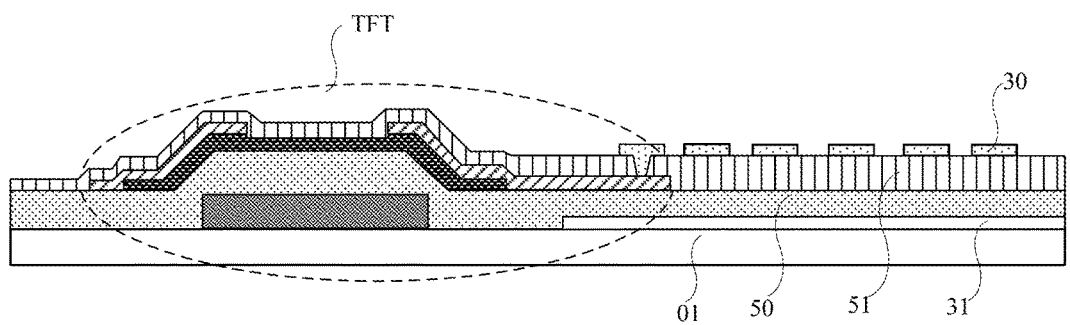
FIG. 6 is a schematic diagram of an arrangement of a pixel electrode and a common electrode according to one embodiment of the present disclosure.

The common electrode 31 and the pixel electrode 30 are arranged in different layers. In this case, whether the pixel electrode 30 and the common electrode 31 are at the upper or lower layer is not limited herein. For example, in some embodiments, as shown in FIG. 5, both the pixel electrode 30 and the common electrode 31 are located above the base substrate 01. The common electrode 31 is located on a side of the pixel electrode away from the based substrate 01. The common electrode 31 consists of strip-shaped electrodes, and the pixel electrode 30 is a planar electrode. In some embodiments, as shown in FIG. 6, both the pixel electrode 30 and the common electrode 31 are located above the base substrate 01. The pixel electrode 31 is located on a side of the common electrode away from the based substrate 01. The pixel electrode 30 consists of strip-shaped electrodes, and the common electrode 31 is a planar electrode. A top view of the pixel electrode 30 and the common electrode 31 in FIG. 6 is shown in FIG. 3.

In some embodiments, the array substrate having the common electrode 31 and the pixel electrode 30 arranged in different layers as the above-mentioned can be applied in the manufacturing of Advanced-Super-Dimensional Switching (ADS) type of liquid crystal display devices. As shown in FIG. 6, when the AD-SDS type of liquid crystal display device displays, a parallel electric field generated between the strip-shaped electrodes of the pixel electrode 30 located in the same plane and a longitudinal electric field generated between the pixel electrode 30 and the common electrode 31 can form a multi-dimensional electric field. As such, all oriented liquid crystal molecules in the liquid crystal boxes located between the strip-shaped electrodes and between the pixel electrode 30 and the common electrode 31 can generate rotary conversion, thereby improving operational efficiency of the liquid crystals in a plane orientation and enhancing light transmission efficiency.

In some embodiments, the pixel electrode 30 and the common electrode 31 are made of transparent conductive material, such as Indium Tin Oxide (ITO).

Furthermore, in some embodiments, as shown in FIG. 3, when the auxiliary capacitor 40 is arranged in the dummy sub-pixel 21, the common electrode 31 in the dummy sub-pixel 21 is not coupled to the common electrode line CL. In this case, the common electrode 31 in the dummy sub-pixel 21 is shared as a first electrode of the auxiliary capacitor 40. The pixel electrode 30 in the dummy sub-pixel 21 is shared as a second electrode of the auxiliary capacitor 40. By respectively coupling the first electrode and the second electrode electrically to a shift register circuit RS in the gate driving circuit 20, the auxiliary capacitor 40 formed by the common electrode 31 and the pixel electrode 30 in the dummy sub-pixel 21 can be used as a part of or whole bootstrap capacitor $C_{st}$ of the shift register circuit RS.

In some embodiments, as shown in FIG. 5, only a passivation layer 51 (PVX) is formed between the pixel electrode 30 and the common electrode 31. In some embodiments as shown in FIG. 6, both a gate insulating layer 50 and a passivation layer 51 are formed between the pixel electrode 30 and the common electrode 31. In some embodiments, when the auxiliary capacitor 40 is formed by the common electrode 31 and the pixel electrode 30 in the dummy sub-pixel 21, the structure shown in the FIG. 5 can be adopted. That is, there is only a passivation layer 51 between the common electrode 31 (first electrode) and the pixel electrode 30 (second electrode), thereby reducing the distance between the first electrode and the second electrode in the auxiliary capacitor 40 as much as possible. As a result, the capacity of the auxiliary capacitor 40 is increased, thereby reducing the coupling noise caused by the clock signal terminal CLK in the gate driving circuit 20.

In some embodiments, the auxiliary capacitor 40 is formed by the common electrode 31 and the pixel electrode 30 in the dummy sub-pixel 21. In addition, because the patterns of the common electrodes 31 and the pixel electrodes 30 in the dummy sub-pixels 21 are respectively the same as those of the common electrodes 31 and the pixel electrodes 30 in the sub-pixels 22 in the active area 10, the manufacturing process of the array substrate is not affected.

An embodiment of respectively coupling the common electrode 31 and the pixel electrode 30 in the dummy sub-pixel 21 to the shift register circuit RS is described below in details.

Figure 7:
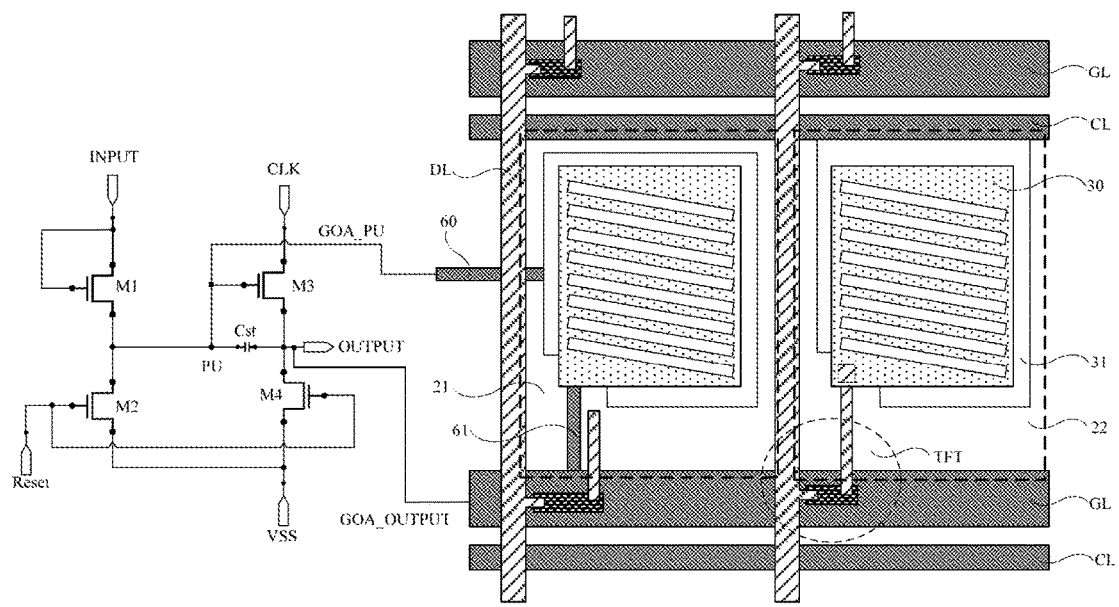
FIG. 7 is a schematic diagram of an arrangement of auxiliary capacitors in dummy sub-pixels according to one embodiment of the present disclosure.

In some embodiments, as shown in FIG. 7, the shift register circuit RS includes a driving transistor M3. A first electrode or a second electrode of the driving transistor M3 serves as the signal output terminal OUTPUT of the shift register circuit RS. The first electrode of the auxiliary capacitor 40 (namely the common electrode 31) is coupled to a gate electrode of the driving transistor M3 (namely a pull-up node PU in the gate driving circuit 20) through a first connection line 60. In addition, the second electrode of the auxiliary capacitor 40 (namely the pixel electrode 30) is coupled to the signal output terminal OUTPUT of the shift register circuit RS through a second connection line 61.

The type of the transistors in the embodiments of the present disclosure is not limited herein. In some embodiments, the transistors are N-type transistors or P-type transistors. In some embodiments, the first electrode of the transistor mentioned above is a source electrode, and the second electrode thereof is a drain electrode. Taking the driving transistor M3 being an n-type transistor as an example, the first electrode of the driving transistor M3 is coupled to the signal output terminal OUTPUT. Accordingly, the first electrode of the driving transistor M3 is a source electrode. The second electrode of the driving transistor M3 is a drain electrode. The drain electrode thereof is coupled to the clock signal terminal CLK.

In addition, materials for the first connection line 60 and the second connection line 61 are not limited herein. In order to improve conduction efficiency, a metal material with relatively high electric conductivity can be adopted. In addition, in order to simplify the manufacturing process, in some embodiments, the first connection line 60 is the same material in the same layer as the gate lines GL or the data lines DL. "In the same layer " means that a film layer for forming specific features such as the first connection line 60 and the gate lines GL is first formed by a same film-forming process, and then a same mask plate is used for forming the specific features by a one patterning process. According to different features, the one patterning process can include multiple times of exposure, developing or etching processes. The specific features in the layered structure can be continuous or discontinuous.

The specific features can also be located at different heights or have different thicknesses. In some embodiments, the second connection line 61 is the same material in the same layer as the gate lines GL or the data lines DL as well.

In some embodiments, the common electrode 31 is coupled to the pull-up node PU through the first connection line 60 and the pixel electrode 30 is coupled to the signal output terminal OUTPUT of the gate driving circuit 20 through the second connection line 61. Furthermore, the array substrate further includes a plurality of gate lines GL. The signal output terminal of each stage of the shift register circuits RS is coupled to one of the plurality of the gate lines GL. For example, as shown in FIG. 4, the shift register s RS1, RS2 . . . RSn are respectively coupled to the gate lines GL1 and GL2 . . . GLn. As shown in FIG. 7, one terminal of the second connection line 61 is coupled to the second electrode of the auxiliary capacitor 40 (the pixel electrode). The other terminal thereof is coupled to the gate line GL. As such, the number of the connecting through holes is reduced. The first connection line 60 and the second connection line 61 are the same material in the same layer as the gate lines GL. In this way, the second connection line 61 and the gate line GL can be of an integrated structure, so that a through hole for electrically connecting the second connection line 61 with the gate lines GL is avoided. In addition, the first connection line 60 and the second connection line 61 can be manufactured with the gate lines GL in one patterning process.

In some embodiments, the patterning process includes a photoetching process, a photoetching process and an etching step. The patterning process may also include printing, ink jetting, and other processes for forming a preset pattern. The photoetching process may include steps of film forming, exposure, and developing etc., which use photoresist, a mask plate, and an exposure machine etc. to form a pattern. A particular patterning process can be selected according to the structure formed in the embodiments of the present disclosure.

In some embodiments, in a patterning process, a single mask exposure process is first used to form different exposure regions. Then, multiple times of etching, ashing and/or other removing processes are performed on the different exposure regions to finally obtain the expected pattern.

In some embodiments, a plurality of auxiliary capacitors 40 coupled to the same stage of shift register circuit RS are respectively located in a plurality of dummy sub-pixels 21 in the same row. As such, second electrodes (pixel electrodes 30) of the plurality of auxiliary capacitors 40 coupled to the same stage of the shift register circuit RS can be coupled to the same gate line GL through different second connection lines 61, thereby simplifying circuit wiring.

Arrangement embodiments of the shift register circuits RS are described as follows:

In some embodiments, the gate driving circuit 20 adopts a single-side driving mode. In this case, the gate driving circuit 20 is arranged on a side of multiple columns of the dummy sub-pixels 21 away from the active area 10. Each stage of the shift register circuits RS of the gate driving circuit 20 is connected to a row of gate line GL. In addition, each stage of the shift register circuit RS is further coupled to auxiliary capacitors 40 arranged in different dummy sub-pixels 21 in the same row.

Figure 8:
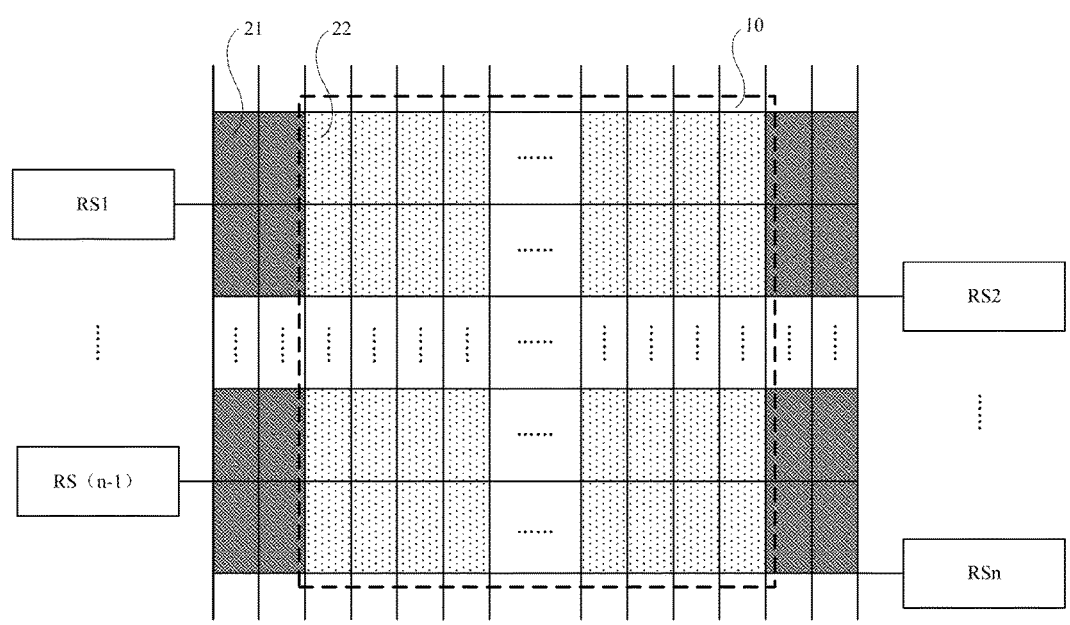
FIG. 8 is a schematic diagram of an array substrate according to one embodiment of the present disclosure.

In some embodiments, the gate driving circuit 20 adopts a double-side driving mode. In this case, as shown in FIG. 8, the two sides of the active area 10 of the array substrate are respectively provided with the dummy sub-pixels 21. Odd numbered stages of shift register circuits (RS1, RS3, RS5 . . . ) and even numbered stages of shift register circuits (RS2, RS4, RS6 . . . ) in the gate driving circuit 20 are arranged on the two sides of the active area 10 of the array substrate respectively.

In this case, the signal output terminals OUTPUT of the odd numbered stages of the shift register circuits (RS1, RS3, RS5 . . . ) are respectively coupled to the odd numbered rows of gate lines (GL1, GL3, GL5 . . . ) in sequence. In the dummy sub-pixels 21 adjacent to the odd numbered stages of the shift register circuits (RS1, RS3, RS5), auxiliary capacitors 40 connected with the odd numbered stages of the shift register circuits (RS1, RS3, RS5 . . . ) respectively are provided.

In addition, the signal output terminals OUTPUT of the even numbered stages of the shift register circuits of (RS2, RS4, and RS6 . . . ) are respectively connected to the even numbered row of gate lines (GL2, GL4, and GL6 . . . ) in sequence. In the dummy sub-pixels 21 adjacent to the even numbered stages of the shift register circuits (RS2, RS4, RS6 . . . ), auxiliary capacitors 40 connected with the even-numbered stages of the shift register circuits (RS2, RS4, and RS6 . . . ) are provided.

Figure 9:
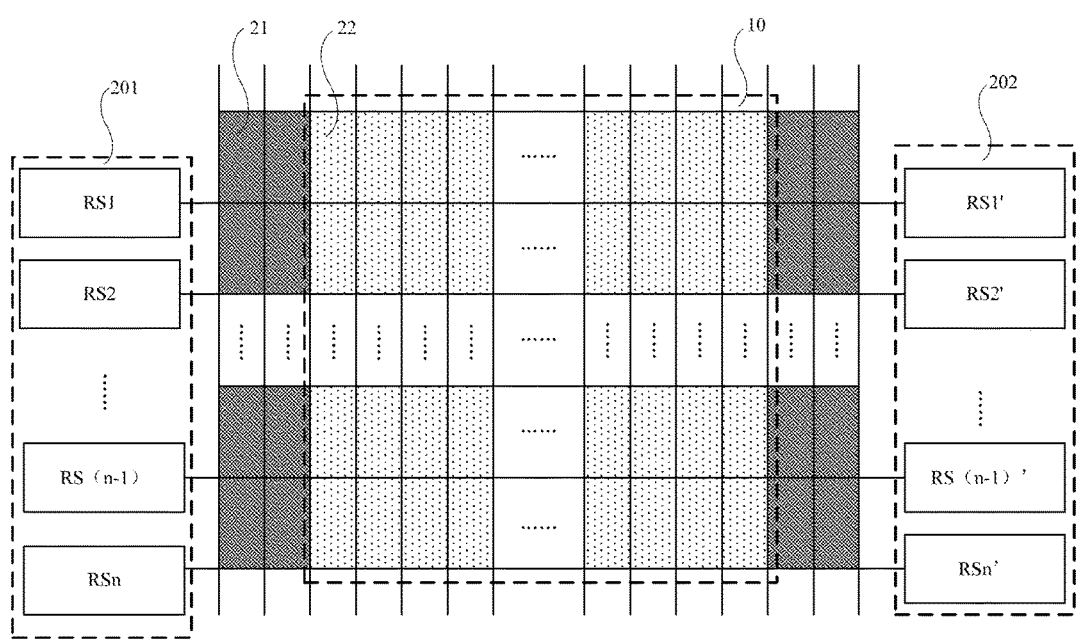
FIG. 9 is a schematic diagram of an array substrate according to one embodiment of the present disclosure.

In some embodiments, the gate driving circuit 20 can also adopt a double-side driving mode. In this case, as shown in FIG. 9, the array substrate has two gate driving circuits, which are the first gate driving circuit 201 and the second gate driving circuit 202 respectively.

In some embodiments, dummy sub-pixels 21 are arranged on both sides of the active area 10 of the array substrate respectively. The first gate driving circuit 201 and the second gate driving circuit 202 are respectively arranged on the both sides of the active area 10.

In this case, in the first gate driving circuit 201 and the second gate driving circuit 202, two shift register circuits of the same stage (eg, RS1 and RS1') are respectively coupled to two terminals of the same gate line (eg, GL1). As such, the first gate driving circuit 201 and the second gate driving circuit 201 are inputted with a gate driving signal from the left terminal and the right terminal of the gate line GL respectively, thereby decreasing phenomenon of delayed signals caused by the relatively large size of the display screen.

In addition, in the dummy sub-pixels 21 adjacent to the first gate driving circuit 201, auxiliary capacitors 40 which are coupled to shift register circuits (RS1, RS2, RS3 . . . ) of the first gate driving circuit 201 are provided according to one embodiment of the present disclosure.

In the dummy sub-pixels 21 adjacent to the second gate driving circuit 202, auxiliary capacitors 40 which are coupled to shift register circuits (RS1', RS2', RS3' . . . ) of the second gate driving circuit 202 are provided according to one embodiment of the present disclosure.

Another example of the present disclosure is a display apparatus. The display apparatus includes an array substrate according to any embodiment of the present disclosure. The array substrate has the same structure and beneficial effects as described above, and thus is not described in detail herein.

In some embodiments, the display apparatus at least includes a liquid crystal display apparatus and an organic light-emitting diode display apparatus. The display apparatus may be a display, a television, a digital photo frame, a mobile phone, a tablet personal computer or any other product or component with a display function.

Specific structure of each stage of shift register circuit RS in the gate driving circuit 20 of the display apparatus is not limited herein, as long as a driving transistor M3 is arranged in the shift register circuit RS. For example, in some embodiments, the structure of the shift register circuit RS can be the structure shown in FIG. 1. In other embodiments, the shift register circuit RS further includes a pull-down circuit for pulling down a pull-up node PU and a signal output terminal OUTPUT. The pull-down circuit is configured to response to the potential of a pull-down node PD. Based on this, when a direct current voltage terminal VDD is used to control the potential of the pull-down node PD, the shift register circuit RS with the pull-down circuit is a direct current model. When the pull-down node PD is configured to response to the potential of an alternating current voltage terminal such as the clock signal terminal CLK, the shift register circuit RS with the pull-down circuit is an alternating current model. For a shift register circuit RS in the alternating current model, the coupling noise caused by the clock signal terminal CLK is larger. By using the auxiliary capacitors 40 according to any above embodiment of the present disclosure, the capacity of the bootstrap capacitor $C_{st}$ in the shift register circuit RS can be effectively increased, thereby reducing the coupling noise effectively.

Different arrangement embodiments of the shift register circuits RS as mentioned above can be adopted in different sizes of display apparatus. In some embodiments, for a small display apparatus, the gate driving circuit 20 adopts a single-side driving mode. In some embodiments, for a small display apparatus, the gate driving circuit 20 adopts a double-side driving mode. In some embodiments, for a large display apparatus, the gate driving circuit 20 can also adopt a double-side driving mode. It is not limited herein.

One of ordinary skill in the art can understand that all or part of the steps of the method embodiment can be executed through a program instructing related hardware. The program can be stored in a computer readable storage medium. When the program is executed, the steps of the method embodiment are executed. The storage medium includes a ROM, a RAM, a magnetic disk, an optical disk and other media capable of storing program codes.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An array substrate, comprising:
   a plurality of gate lines;
   a plurality of data lines intersecting the gate lines; and
   a first gate driving circuit comprising a plurality of shift register circuits in a non-active area,
   wherein the gate lines and the data lines define a plurality of sub-pixels in an active area and a plurality of dummy sub-pixels in the non-active area adjacent to the active area, the first gate driving circuit is farther away from the active area than the plurality of the dummy sub-pixels; and wherein at least one of the dummy sub-pixels comprises an auxiliary capacitor, a shift register circuit in the first gate driving circuit is coupled to the auxiliary capacitor, and the auxiliary capacitor forms at least a part of a bootstrap capacitor in the shift register circuit.

2. The array substrate according to claim 1, further comprising:

a common electrode line, a common electrode and a pixel electrode in each of the dummy sub-pixels in the non-active region and each of the sub-pixels in the active area;

wherein the common electrode and the pixel electrode are arranged in different layers, and;

wherein in at least one of the dummy sub-pixels, the common electrode is shared as a first electrode of an auxiliary capacitor and the pixel electrode is shared as a second electrode of the auxiliary capacitor.

3. The array substrate according to claim 2, wherein the shift register circuit in the first gate driving circuit comprises a driving transistor; the first electrode of the auxiliary capacitor is coupled to a gate electrode of the driving transistor through a first connection line; and the second electrode of the auxiliary capacitor is coupled to a signal output terminal of the shift register circuit through a second connection line.

4. The array substrate according to claim 2, wherein there is only a passivation layer between the common electrode and the pixel electrode.

5. The array substrate according to claim 2, wherein the common electrode and the pixel electrode are made of indium tin oxide.

6. The array substrate according to claim 2, wherein the pixel electrode consists of strip-shaped electrodes and the common electrode is a planar electrode.

7. The array substrate according to claim 3, wherein signal output terminals of the plurality of the shift register circuits are respectively coupled to the gate lines, one terminal of the second connection line is coupled to the second electrode of the auxiliary capacitor, and the other terminal of the second connection line is coupled to one of the gate lines.

8. The array substrate according to claim 3, wherein the first connection line, the second connection line, and the gate lines are made of the same material in the same layer.

9. The array substrate according to claim 1, wherein each of the plurality of the dummy sub-pixels comprises a thin film transistor, a first electrode of the thin film transistor is coupled to a data line, and a second electrode of the thin film transistor is floating.

10. The array substrate according to claim 1, further comprising a plurality of auxiliary capacitors in the dummy sub-pixels respectively, wherein the auxiliary capacitors coupled to a same stage of shift register circuit are respectively located in a plurality of the dummy sub-pixels in the same row.

11. The array substrate according to claim 1, wherein the plurality of the shift register circuits and the plurality of the dummy sub-pixels are at one side of the active area, and each of the plurality of the shift register circuits is coupled to one of the gate lines and auxiliary capacitors in the dummy sub-pixels of the same row.

12. The array substrate according to claim 11, wherein the plurality of the dummy sub-pixels comprises two or three columns of the dummy sub-pixels.

13. The array substrate according to claim 1, wherein both the plurality of the shift register circuits and the plurality of the dummy sub-pixels are at two sides of the active area, each of the plurality of the shift register circuits is coupled to h one of the gate lines and auxiliary capacitors in the dummy sub-pixels of the same row at the same side.

14. The array substrate according to claim 13, wherein the plurality of the dummy sub-pixels comprises two or three columns of the dummy sub-pixels at the two sides of the active area respectively.

15. The array substrate according to claim 1, further comprising a second gate driving circuit; wherein the plurality of the dummy sub-pixels are at two sides of the active area, the first gate driving circuit and the second gate driving circuit are at the two sides of the active area respectively;

two shift register circuits of the same stage in the first gate driving circuit and the second gate driving circuit respectively are coupled to two terminals of a same gate line respectively; and each of the shift register circuits in the first gate driving circuit and the second gate driving circuit is coupled to auxiliary capacitors in the dummy sub-pixels of the same row at the same side.

16. A display apparatus comprising the array substrate according to claim 1.

* * * * *